(12) United States Patent
Anderson (10) Patent No.: US 9,846,864 B2
(45) Date of Patent: Dec. 19, 2017

(54) SYSTEM AND METHOD FOR OPEN DISTRIBUTION OF DIGITAL MEDIA

(76) Inventor: Jeffrey C. Anderson, Yorba Linda, CA (US)

( * ) Notice: Subject to any disclaimer, the term of this patent is extended or adjusted under 35 U.S.C. 154(b) by 1598 days.

(21) Appl. No.: 12/578,457

(22) Filed: Oct. 13, 2009

(65) Prior Publication Data

US 2011/0087886 A1   Apr. 14, 2011

(51) Int. Cl.
*G06F 21/00* (2013.01)
*G06Q 20/12* (2012.01)

(52) U.S. Cl.
CPC ......... *G06Q 20/123* (2013.01); *G06Q 20/12* (2013.01)

(58) Field of Classification Search
USPC ...................................... 705/50–79
See application file for complete search history.

(56) References Cited

U.S. PATENT DOCUMENTS

| | | | |
|---|---|---|---|
| 7,779,058 B2 * | 8/2010 | Shea ................. | G06F 21/10 707/705 |
| 2003/0125964 A1 | 7/2003 | Chang et al. | |
| 2005/0097006 A1 | 5/2005 | Nyako | |
| 2005/0154608 A1 | 7/2005 | Paulson et al. | |
| 2006/0004665 A1 * | 1/2006 | Stefik ............... | G06F 21/10 705/51 |
| 2006/0053079 A1 * | 3/2006 | Edmonson ......... | G06F 21/10 705/59 |
| 2006/0248013 A1 | 11/2006 | Ebert et al. | |
| 2006/0265331 A1 | 11/2006 | Hughes et al. | |
| 2007/0038567 A1 * | 2/2007 | Allaire ............. | G06Q 30/0239 705/50 |
| 2007/0294175 A1 | 12/2007 | Thelen | |
| 2008/0109249 A1 | 5/2008 | Paulson et al. | |
| 2008/0270151 A1 | 10/2008 | Mahoney et al. | |
| 2009/0048860 A1 | 2/2009 | Brotman et al. | |
| 2009/0150406 A1 | 6/2009 | Giblin | |
| 2010/0100433 A1 | 4/2010 | Penfield | |

FOREIGN PATENT DOCUMENTS

| | | | | |
|---|---|---|---|---|
| EP | 1524580 A2 * | 4/2005 | ............. | G06F 21/10 |
| GB | WO 2006117555 A2 * | 11/2006 | ............. | G06F 21/10 |

OTHER PUBLICATIONS

Coyle, Karen. The Technology of Rights: Digital Rights Management (Nov. 19, 2003) http://www.kcoyle.net/drm_basics.pdf.*

* cited by examiner

*Primary Examiner* — James A Reagan
(74) *Attorney, Agent, or Firm* — Sheppard, Mullin, Richter & Hampton LLP (57) ABSTRACT

Various embodiments of the present invention provide a system and method for open digital media distribution. According to one embodiment, a system is provided which performs the operations of: creating a profile (e.g., artist or label profile) based on an input from a first party; receiving a digital media upload from the first party, wherein the digital media upload contains media content and the first party has a property interest in the media content; receiving from the first party an assignment of a payment account to the digital media upload, such that money from sales relating to the digital media upload is deposited into the payment account; receiving from the first party a sales parameters associated with the digital media upload; presenting through a computing device the digital media upload for sale to a second party; and selling the digital media upload to the second party through a computing device.

19 Claims, 5 Drawing Sheets

SYSTEM AND METHOD FOR OPEN DISTRIBUTION OF DIGITAL MEDIA

FIELD OF THE INVENTION

The present invention relates to digital media, and more particularly, some embodiments of the present invention relate to facilitating open distribution of digital media.

DESCRIPTION OF THE RELATED ART

With advent of the Internet, media distribution (e.g., music distribution) using digital means has become ubiquitous. For example, over the years, purchasing and downloading of digital media has been facilitated in a number of ways using a computer (or some other computing device such as smartphones, PDA's, portable game systems, etc.), including a digital retail store provided via a user application (e.g., Apple Itunes®, Windows Media Player) or a website (e.g., Amazon.com, Best Buy). Generally, these digital retail stores offer a variety of media (movies, TV shows, music, etc.) in various digital formats (e.g., MOV, MPG, MP3, AAC, WAV, etc.). The digital retail store's inventory comprises a catalog/library of digital media provided through a licensing agreement established between the digital retailer and the media owners (e.g., movie studios, media labels, TV studios, etc.). Upon purchase of a digital medium through the digital store, a commission is paid to the digital retailer from the sale, and the profits are allocated to other parties (e.g., medium content owner, medium distributor, etc.) according to the preferences of the digital retailer and/or the licensing agreement.

This sort of distribution system is often characterized as passive, and merely an online warehouse of media. Such traditional digital media distribution systems are often hostile toward market participants (e.g., digital media owners, consumers, etc.) and do not harness the keys to an "efficient market".

According to the efficient market hypothesis, it is impossible to "beat the stock market" because existing share prices always incorporate and reflect all relevant information. The profit opportunities represented by any temporarily undervalued, or overvalued, stock motivate competitive trading that moves the price back toward fair value. As a result, stocks always trade at their fair value. Hence, whether it's the stock market or the media market, the keys to an "efficient market" are profit opportunities for market participants that are significant enough to motivate an exhaustive search for mis-priced assets and the dissemination of all the relevant information gathered by the collective search process.

In the context of the media industry, value is equivalent to the demand for a given media that would be realized given the allocation of an ideal amount of resources (production, promotion, retail exposure, etc.). The actual amount of resources allocated to a given media is equivalent to the market price. Media is "mis-priced" when resources are allocated to the creation and/or sale of media in a disproportionate relationship to the demand for that media. Currently, the most significant resources are allocated to media by a small number of influential corporate entities. These "gatekeepers" make demand projections based largely on personal taste and comparisons to the demand for similar media. As a result, resource allocation decisions are often at the mercy of inaccurate projected demand, corporate dynamics, and personal agendas. This process has historically led to "mis-pricing" of media and adverse effects on all market participants. When demand for digital media is underestimated it leads to a lack of exposure and lost potential sales. When demand is overestimated it leads to unwarranted exposure and lost development, production, and promotion costs. In either case, consumers are forced to make purchase decisions with very little reliable information about the full range of choices available to them or the relative quality of these choices. The reaction by consumers to such a seemingly hostile and increasingly chaotic environment has threatened the media industry as a whole and instigated a frantic effort to reform digital media distribution.

At present, none of the current approaches to reform digital media distribution resolve the inefficiencies of the media marketplace. Although there is an expanding number of distributors that will offer an endless amount of space in their online warehouse, there are very few market participants with any incentive to search these vast databases for media with underestimated demand. A distributor may do its best to determine which media to feature, or catalog their database in the most user-friendly manner possible, but it is still up to the consumer to determine relative value. To do this accurately would require a consumer to search the millions of hours of media to gain all relevant information of the marketplace. Most often consumers are forced to act on a specific recommendation, search all the various databases themselves, or choose from the media promoted by a few large companies that have made their best guess as to which will have the highest demand. Accordingly, all the digital media distribution models still rely on a few gatekeepers to determine the media about which the market will receive relevant information.

In an attempt to progress beyond the passive warehouse of media, some traditional distributors have added the use of affiliates. Like all traditional distribution models, sales made through a traditional distributor using affiliates are subject to an industry standard distribution fee that is set by the distributor. The affiliate approach allows fans to earn some small portion of the standard distribution fee (or in the alternative earn store credit) for sales of media made on the distributor's site from links posted by the fan on other websites. Usually, affiliates receive only a small portion of the standard distribution fee (or a store credit) and the portion of the fee to be credited to an affiliate is pre-determined by the distributor. In addition, the sales parameters are frequently standard for all affiliates and for all the digital media offered on the site. This approach may allow the traditional distributor to profit from additional sales, however, this approach suffers from continued market inefficiency, rigidity, and fragmentation. The limits on the opportunity for profit, the rigidity of sales parameters (for rights owners and affiliates), and the requirement to choose an association with one or more distributors in an environment of an increasing number of competitors undermine the principles of market efficiency.

Therefore, there exists a need for a digital media distribution system that would provide the marketplace with relevant information gained from the collective effort of all the market participants continuously searching the vast databases of digital media because they all have the ability to make significant profit from the information that they find. Such information would give consumers the ability to make accurate purchase decisions, give media companies the ability to make accurate investment decisions, and would truly level the playing field for all digital media distribution rights owners, producers, and artists. This system would allow the market to determine the amount of available resources a given digital media will receive. In some instances, such a system would allow all the market participants to have the opportunity to profit from undiscovered media, create a race to discover these opportunities, and let market preferences determine the demand for all digital media. In further instances, such a system would use the collective findings of all market participants to instantly report to the marketplace so that other participants can act upon these findings. Such an open, or user, distribution system would lead to a more efficient digital media distribution system, and have significant advantages over traditional systems with respect to efficiency, flexibility, synergy, and scale.

BRIEF SUMMARY OF EMBODIMENTS OF THE INVENTION

Various embodiments of the present invention provide a system and method that facilitate open digital media distribution. Open, or user, digital media distribution describes a system and method by which digital media distribution rights owners (DMDRO) offer their digital media for sale and may simultaneously make an open offer to enter into a distribution agreement with any, or all, interested users (e.g. distributors, websites, individuals, etc.) who agree to terms preset by the DMDRO. Such a distribution system eliminates the need for the traditional distributor (online warehouse and those employing an affiliate approach) to act as an intermediary.

Accordingly, some embodiments of the present invention provide a distribution system, or method, by which DMDRO are able to offer their media for sale to, and enter into distribution contracts with, the public directly. Such embodiments facilitate distribution such that there is no traditional distributor acting as an intermediary, only a system or method facilitating the transactions. For some embodiments, the distribution fees that are usually collected by a traditional distributor can now be retained by the DMDRO when the DMDRO makes a direct sale to the public and the entire distribution fee can be paid in full to a user distributor who makes a sale to the public through their own distribution channels. The user distributor receives the distribution fee according to the terms agreed upon in advance by the user distributor and the DMDRO.

Additionally, some embodiments allow each individual DMDRO to set all sales parameters and continue to adjust them in the most efficient way. These parameters could include price, distribution fee (kept by the DMDRO unless sold through a user distributor), and whether or not the given media is available for sale by a user distributor. The parameters are evaluated and then either accepted or rejected by potential user distributors on a case by case basis.

Furthermore, some embodiments allow transactions from multiple user distributors to be processed in one system, thereby enabling the DMDRO to gain valuable information about the marketplace. DMDRO can analyze that information and adjust sales parameters based on the sales from user distributors and customer feedback, among many other options. This creates more accurate pricing in the marketplace. The larger the number of DMDRO in the system, the more comprehensive and more accurate the market information becomes.

As such, various embodiments of the present invention are designed to create a living distribution network that would act as a market facilitator processing transactions, hosting the network of market participants, providing relevant information to the market, and creating real profit opportunities for all market participants.

According to some embodiments, a system is provided for digital media distribution, performing the operations of: creating a profile (e.g, artist, album, or label profile) based on an input from a first party (e.g., a digital media distributor or a digital media owner desiring to distribute digital media—a digital media distribution rights owner); receiving a digital media upload from the first party, wherein the digital media upload contains media content and the first party has a property interest (e.g., license to distribute, ownership) in the media content; receiving from the first party an assignment of a payment account to the digital media upload, such that money from sales relating to the digital media upload is deposited into the payment account; receiving from the first party sales parameters associated with the digital media upload; presenting through a computing device the digital media upload for sale to a second party; and selling the digital media upload to the second party through a computing device. The first party may be the artist/creator of the media content, the media producer of the media content, or the media label.

For some embodiments, selling the digital media upload is facilitated through a website. In other embodiments, selling of the digital media upload is facilitated through a user application. In yet further embodiments, the selling of the digital media upload is facilitated through a third party and the third party is a media distributor (i.e., third party user distributor). The third party may use also use a website or a user application to facilitate a sale of the digital media upload. Depending on the embodiment, upon sale of the digital media upload, the proceeds from selling the digital media upload are transferred to the payment account of the first party.

In some embodiments, the sales parameters include at least one of: a sale price for the digital media upload; whether the media upload is sellable by a third party; rules that govern sales of the digital media upload; and a distribution fee to be paid to the third party upon sale of the digital media upload.

In other embodiments, the input from the first party comes from answers provided to a questionnaire. In additional embodiments, upon receiving the digital media upload, the digital media upload is added to a digital media library.

In various embodiments, the system further includes transferring a distribution payment to the second party upon sale of the digital media upload. Depending on the embodiment, the distribution payment may be from the first party. Additionally, in some embodiments, the distribution payment may be from the payment account associated with the digital media upload.

In particular embodiments, the system further includes creating a user and associated user profile. The user may be the first party, second party, or the third party.

Further embodiments include gathering statistical information from activities of a user. The statistical information may be utilized to provide the user with relevant information regarding digital media uploaded. Depending on the embodiment, the statistical information may track a number of things that include, but are in no way limited to, patterns, preferences, or feedback of the user. Yet further embodiments include assisting the user in locating digital media uploaded, which may utilize the statistical information.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for digital media distribution. Through various embodiments of the present invention, media owners can upload a piece of media to a digital store front, where it may be added to a catalog/library of digital media made available for purchase to the public. For some such embodiments, the media owner works directly with a digital media distribution rights owner and creates a profile under which a medium is uploaded. For example, a media owner may create a profile for an artist/content creator, for the medium's title (e.g., album title, movie title), or for a general media label (e.g., record company, media label, movie studio), with the profile being associated with the uploaded medium. After upload, the medium is presented for purchase through a digital store, which may be a website or a user application. Additionally, some embodiments of the invention allow the media owner to create their own digital store on the digital media distribution rights owner. Additional embodiments, allow third party distributors (i.e., other distributors, such as third party user distributors) to distribute the uploaded medium through their third party digital store on behalf of the original digital media distribution rights owner that received the digital medium upload.

Another aspect of some embodiments allows the media owner to set and associate sales parameters to their uploaded medium, which govern such things as the media owner's conditions for a sale, preferences for fees (e.g., distribution fees), preferences for distributions, and permissions for allowing third party distribution of the uploaded digital medium. Further aspects of various embodiments integrate social networking components into the digital media distribution system.

Additional embodiments gather statistical information from users (e.g., media owners, distributors, third party distributors) and determine preferences and habits of the system's community at large. Specifically, such embodiments can use the gathered statistical information to identify trends on the digital media distribution system, assist users in certain activities on the system (e.g., suggest media purchases, determine popular categories and types of media, assist a user in searching for media, suggest an appropriate third party distributor for uploaded media).

Before describing the invention in further detail, it may be useful to describe a few example environments in which various embodiments of the present invention can be implemented. One such example is that of illustrated in FIG. 1.

Figure 1:
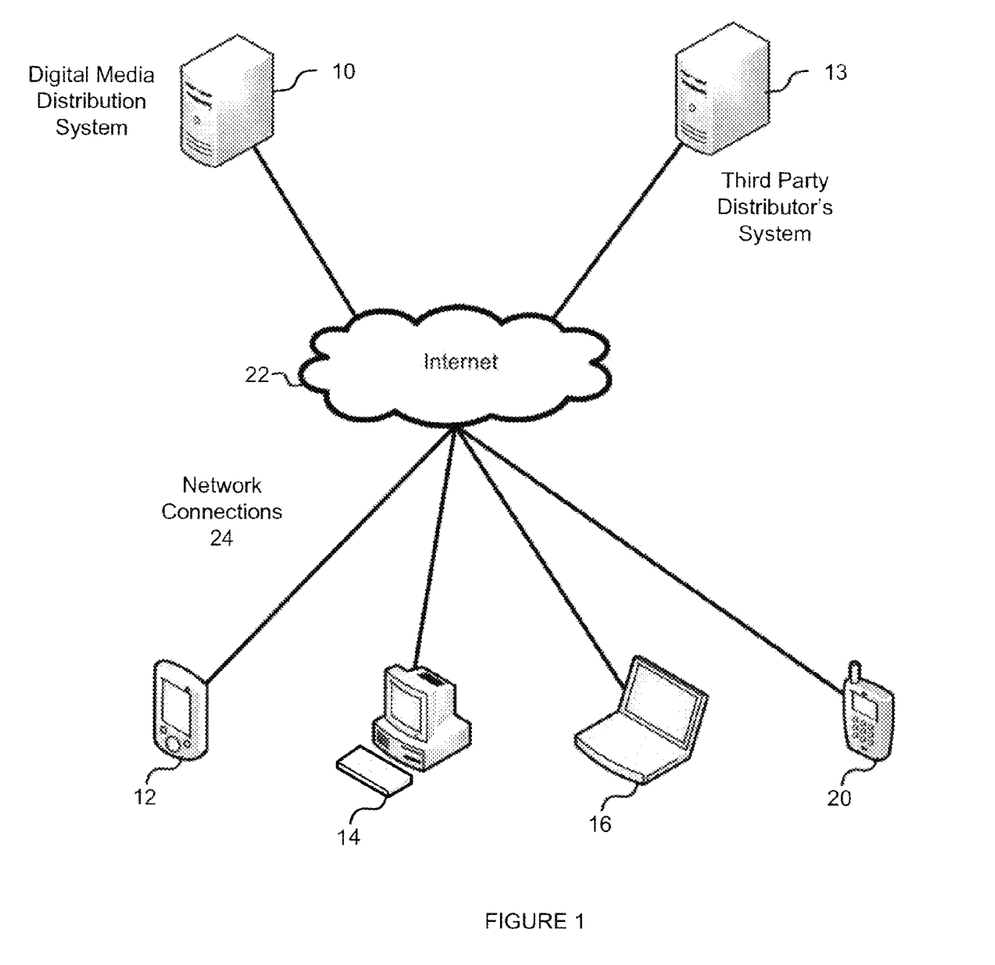
FIG. 1 is a diagram illustrating an example digital media distribution system according to one embodiment of the present invention implemented in an example environment.

FIG. 1 illustrates an example digital media distribution system 10 in accordance with one embodiment of the invention, and implemented in an environment comprising various computing devices connected to the distribution system 10 through the Internet 22. As shown, such computing devices as a PDA 12 (e.g., Windows Mobile® device), a desktop computer 14, a laptop computer 16, and a smartphone 20 (e.g., iPhone®), through their respective network connections 24, can either interact directly with the digital media distribution system 10 or, optionally, interact with a third party distributor's system 13 to purchase media distributed through digital media distribution system 10. The various computing devices (12, 14, 16, and 20) and the distribution systems (10, 13) described within herein may be implemented using the example computer system illustrated in FIG. 5.

Figure 2:
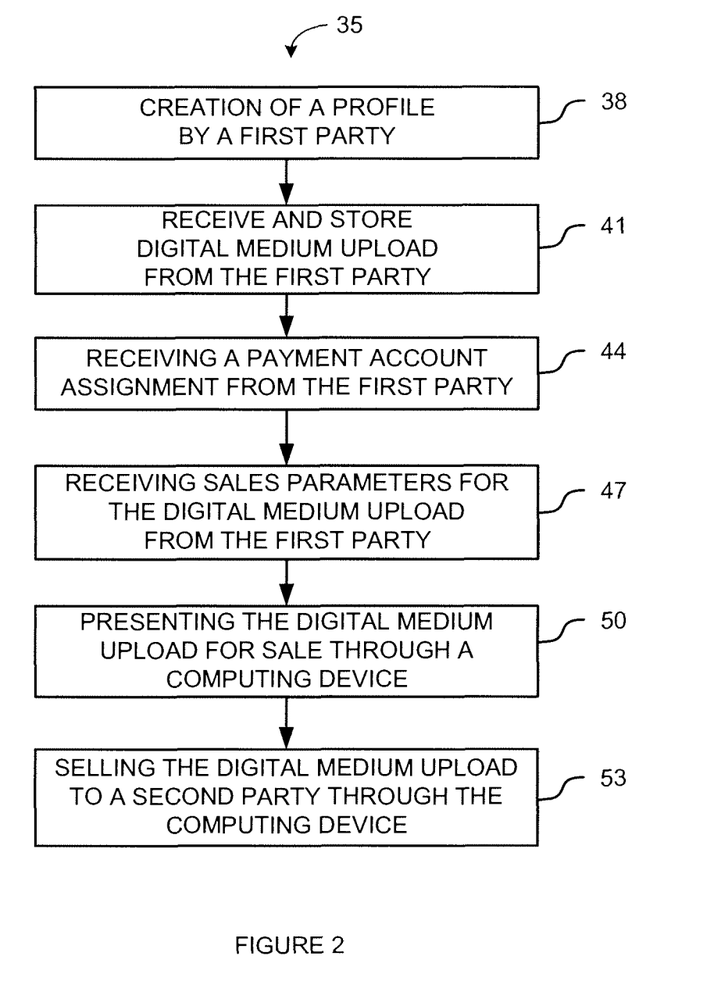
FIG. 2 is a diagram illustrating an example digital media distribution method according to one embodiment of the present invention.

FIG. 2 illustrates an example digital media distribution method 35 according to one embodiment of the present invention. Method 35 begins with the creation of a profile by a first party at operation 38. The first party is an entity wishing to upload a medium to the digital distribution system. The first party may be a sole or partial proprietor of the medium to be uploaded, or possess some other form property interest in the media (i.e., license). The profile created may be of the party uploading the medium (e.g., the first party), or the artist/content creator of the medium to be uploaded. For example, a solo artist X, who has a created and digitally recorded a media piece Y, may create a profile for artist X or for media piece Y at operation 38. In some instances, the profile created may be of a movie studio or record/media label that produced the medium. In addition, the profile may be created based on answers provided by the first party in a questionnaire presented by the digital distribution system.

Following the creation of the profile, the first party uploads the digital medium to the digital distribution system at operation 41, where the digital medium is received and stored. Depending on the preference of the first party, the digital medium may be added to an existing digital store hosted by the digital distribution system, or added to a new digital store created on the digital distribution system. As noted earlier, the digital store created and subsequently hosted by the digital distribution system may be a website or a site accessible through a user application. In addition, the newly created digital store may be associated to either the first party that uploaded the digital medium, or the profile created by the first party in operation 38. Optionally, as further discussed later with respect to FIG. 4, a third party distributor may offer and sell the digital medium uploaded to the distribution system through their third party distribution system (e.g., website-based store or application-accessible store front), depending on the permissions and preferences set by the first party.

In addition to uploading the digital medium, the first party assigns a payment account to the uploaded digital medium, or to the newly created digital store, at operation 44. The payment account assignment determines the proper account to which proceeds from sales are transferred. The sales may be that of a particular digital medium or that of a particular digital store (e.g., newly created digital store).

Further, the first party is able to set sales parameters for the uploaded digital medium at operation 47. For example, the first party may set the conditions for the sale of the digital medium, set the price of the digital medium, set permissions for whether a third party distributor can sell the digital medium through their digital store, or set the distribution fee paid to the distributor upon sale of the digital medium.

Once the payment account is assigned to the digital medium and the sales parameters for digital medium are set, the digital medium is presented for sale through a computing device (operation 50). The sales offering can be facilitated in a number of ways including, but in no way limited to, posting the digital medium on a new or existing website-based store (which may be hosted on the digital media distribution system, as previously described), and posting a digital store accessible through a user application. Method 35 concludes at operation 53 with the sale of the digital medium to a second party (e.g., public consumer) through a computing device.

Figure 3:
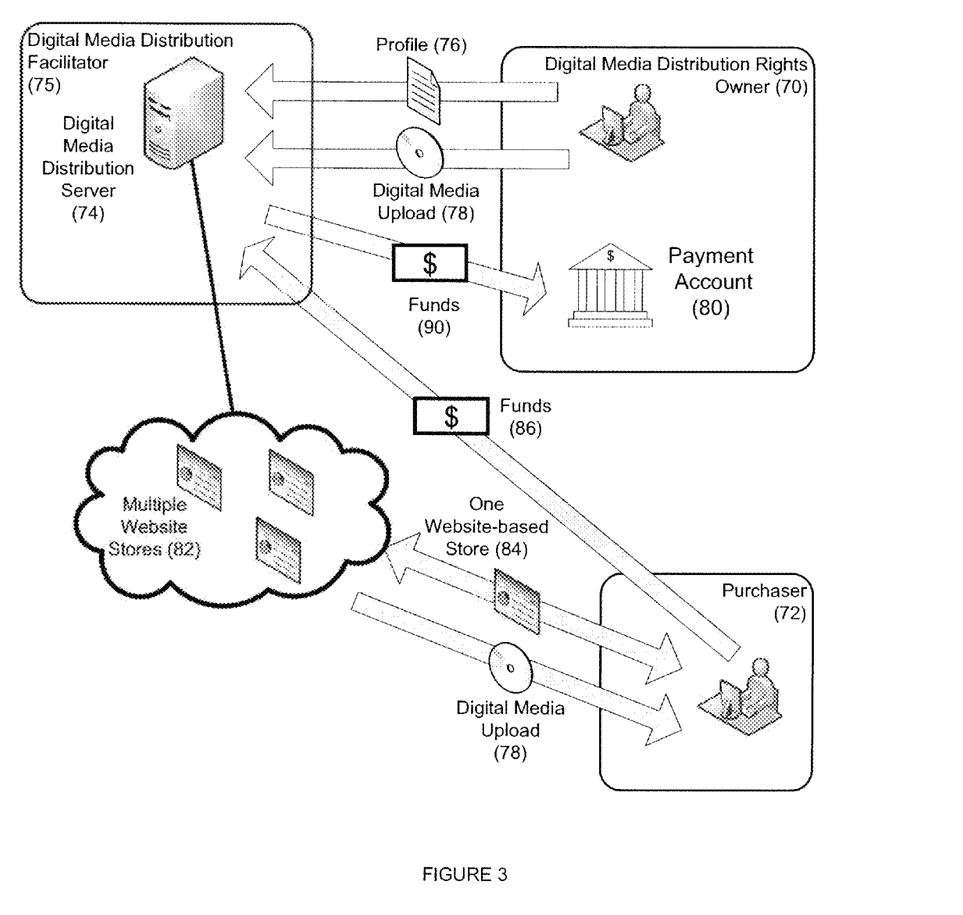
FIG. 3 is a diagram illustrating an example digital media distribution system involving two parties according to one embodiment of the present invention.

FIG. 3 is a diagram illustrating an example digital media distribution system involving two parties according to one embodiment of the present invention. More particularly, FIG. 3 depicts the interaction between a digital media distribution rights owner 70, a digital media distribution server 74, and a purchaser 74 during purchase of digital medium in accordance with one embodiment of the invention. A digital media distribution facilitator 75 owns and operates the digital media distribution server 74 on behalf of a digital media distribution rights owner 70, thereby allowing the digital media distribution rights owner to function as a digital media distributor. Typically, the digital media distribution rights owner 70 has a property interest (e.g., license to distribute, ownership) in the digital media upload 78.

The digital media distribution rights owner 70 sends a digital media upload 78 to the digital media distribution server 74. In addition, the distributor 70 creates a profile 76 under which the digital media upload 78 will be posted. The profile may be one of the artist or content creator of the digital media upload 78 or, optionally, be the media label under which the digital media upload 78 was produced. Upon creation of the profile 78 and receipt of the digital media upload 78, the server 74 posts the digital media upload 78 to one or more website-based stores 82 hosted on the digital media distribution server 74. Which website-based stores post the uploaded digital media may depend on the preferences of the digital media distribution rights owner 70, or preferences of the digital media server 74.

Once posted, the purchaser 72 is able to view and purchase the digital media upload 78 through one of the website-based stores 84 hosted by the server 74. Upon purchase, funds 86 from the purchaser 72 are transferred to the digital media distribution server 74, which in turn transfers funds 90 to the payment account 80 assigned by the distributor 70. Depending on the sales parameters set for the digital media 78, or the sales parameters set for the website-based store 84, the funds 90 transferred to the payment account 80 may be the entire sum of funds 86 received from the purchaser, or the sum of funds 86 less a distribution fee paid to the operator of the digital media distribution server (i.e., the digital media distribution facilitator 75).

Figure 4:
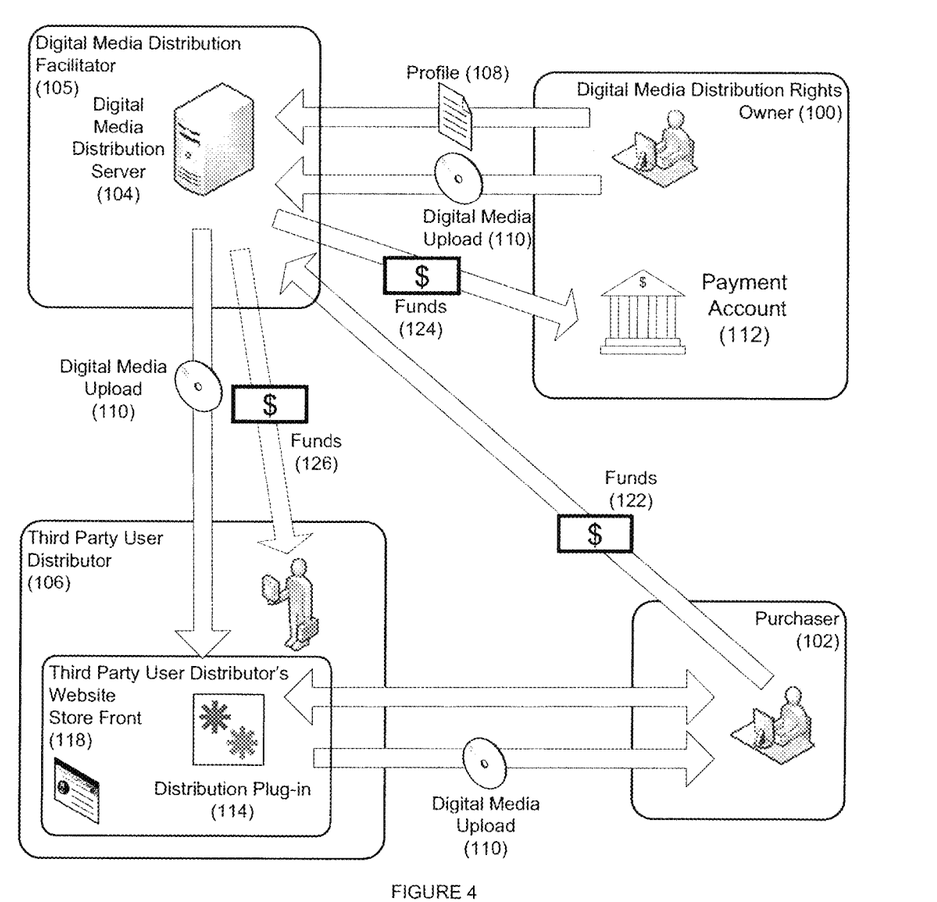
FIG. 4 is a diagram illustrating an example digital media distribution system involving three parties according to one embodiment of the present invention.

FIG. 4 is also a diagram illustrating an example digital media distribution according to one embodiment of the present invention. Unlike FIG. 3, however, FIG. 4 shows another distributor, also referred to as a third party user distributor 106, through which the digital media 110 is purchased and distributed. Depending on the embodiment, a third party user distributor 106 is a lesser party that assists the digital media distribution rights owner 70 in distribution of the digital media upload 78. Typically, in return, the third party user distributor receives a portion of the distribution fees earned by the digital media distribution rights owner 70.

Like the embodiment of FIG. 3, digital media distribution rights owner 100 of FIG. 4 sends a digital media upload 110 to the digital media distribution server 104, and creates a profile 108 under which the digital media upload 110 will be posted. However, unlike the embodiment of FIG. 3, the digital media upload 110 is also available for distribution through a third party user distributor 106 who, as a third party distributor, can sell the digital media upload 110 to a purchaser 102 through a third party user distributor's website-based store 118 hosted on the third party user distributor's own web server. In the instant case, the third party user distributor's web based store 118 includes a distribution plug-in 114, which communicates to the digital media distribution server 104 directly, and facilitates purchase and transmission of the digital media upload 110 to the purchaser 102. In some embodiments, the distribution plug-in 114 is embedded into the third party user distributor's web based store 118. As previously noted, the permission for third party distribution of the digital media upload 110 is set by the digital media distribution rights owner 70 via the media's sales parameters.

Upon purchase of the digital media upload 110, the proceeds from the sale of the media can be distributed in a number of ways. In the illustrated example, the funds 122 from the purchaser 102 are transferred to the digital media distribution server 104, which in turn transfers funds 124 to the assigned payment account 112 less any distributions fees. If the third party user distributor 106 is to receive distribution fees, such fees (funds 126) are transferred from the digital distribution server 104 to the third party user distributor's designated account. If the digital media distribution facilitator 105 is to retain any distribution fees as well, those fees are subtracted from funds 122 before funds 124 are transferred to the payment account 112.

Alternatively, the funds 122 from the purchaser 102 are transferred to the third party user distributor 106 via the third party user distributor's web server, which hosts the third party user distributor's web based store front 118. The third party user distributor's web server, in turn, transfers funds 122 to the digital media distribution server 104 where the digital media distribution facilitator 105 retains its distribution fee, if set to have one, and transfers the remainder of the funds 124 to the payment account 112. In such embodiments, the proprietor loses control over the distribution fee to the third party user distributor 106, while retaining control over the distribution fee to the digital media distribution facilitator 105.

The digital media distribution servers depicted in FIGS. 3 and 4 may be capable of gathering statistical information on its users (e.g., proprietor of media content, purchaser, third party user distributor), and using that information to determine trends that assist users in certain activities on the system. For example, based on the types of statistical information and trends generated, the digital media distribution server may be able to suggest media purchases to purchasers, determine popular media categories to which a proprietor may want to post their digital media upload, or assist a purchaser searching for media on the server.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 5:
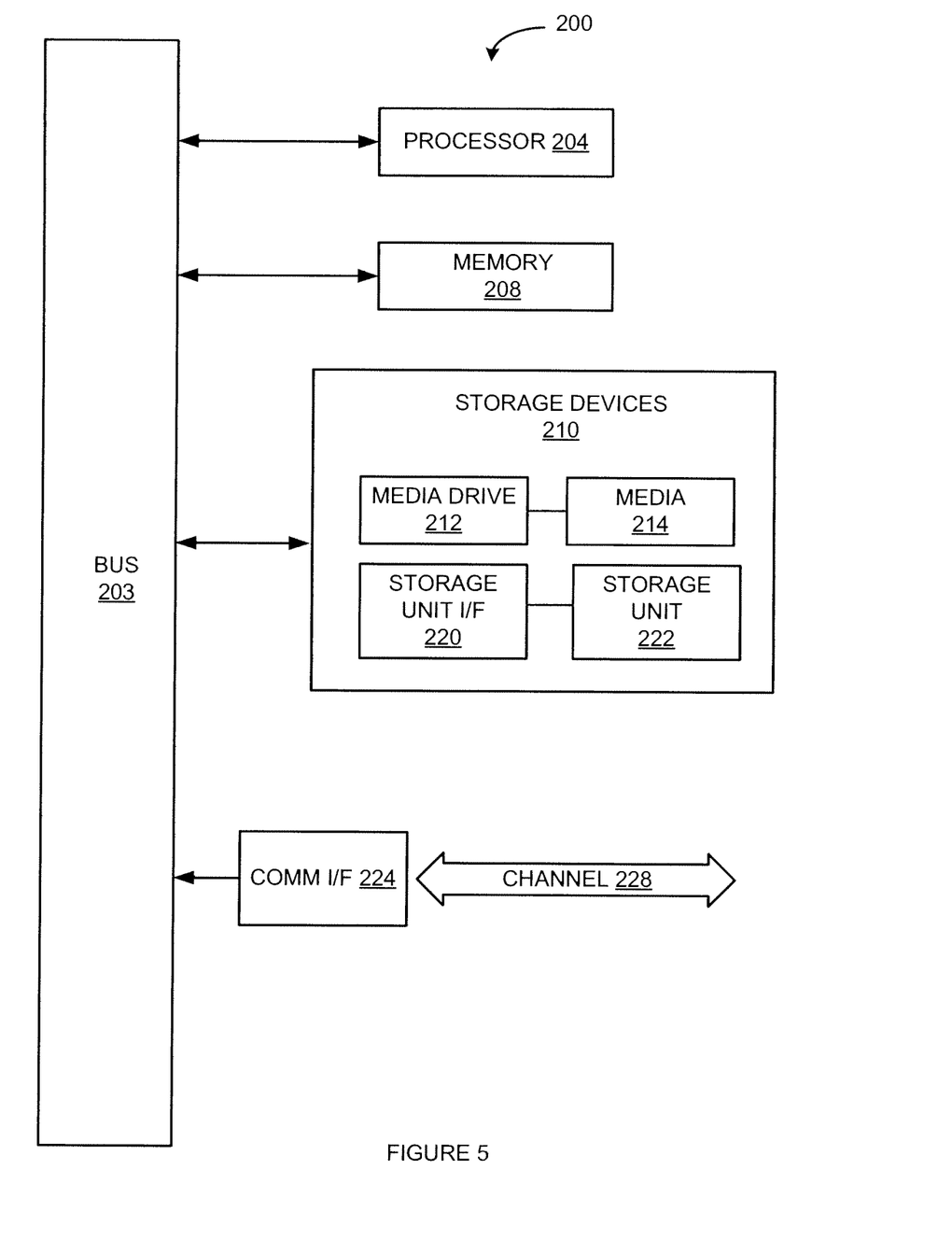
FIG. 5 is a diagram illustrating a computer system that can be used in conjunction with some embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 5. Various embodiments are described in terms of this example-computing module 200. After reading this description, it will become apparent to a person skilled in the relevant art how to implement the invention using other computing modules or architectures.

Referring now to FIG. 5, computing module 200 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 200 might include, for example, one or more processors, controllers, control modules, or other processing devices, such as a processor 204. Processor 204 might be implemented using a general-purpose or special-purpose processing engine such as, for example, a microprocessor, controller, or other control logic. In the example illustrated in FIG. 5, processor 204 is connected to a bus 203, although any communication medium can be used to facilitate interaction with other components of computing module 200 or to communicate externally.

Computing module 200 might also include one or more memory modules, simply referred to herein as main memory 208. For example, preferably random access memory (RAM) or other dynamic memory might be used for storing information and instructions to be executed by processor 204. Main memory 208 might also be used for storing temporary variables or other intermediate information during execution of instructions to be executed by processor 204. Computing module 200 might likewise include a read only memory ("ROM") or other static storage device coupled to bus 203 for storing static information and instructions for processor 204.

The computing module 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a floppy disk drive, a magnetic tape drive, an optical disk drive, a CD or DVD drive (R or RW), or other removable or fixed media drive might be provided. Accordingly, storage media 214 might include, for example, a hard disk, a floppy disk, magnetic tape, cartridge, optical disk, a CD or DVD, or other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing module 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory module) and memory slot, a PCMCIA slot and card, and other fixed or removable storage units 222 and interfaces 220 that allow software and data to be transferred from the storage unit 222 to computing module 200.

Computing module 200 might also include a communications interface 224. Communications interface 224 might be used to allow software and data to be transferred between computing module 200 and external devices. Examples of communications interface 224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 224 might typically be carried on signals, which can be electronic, electromagnetic (which includes optical) or other signals capable of being exchanged by a given communications interface 224. These signals might be provided to communications interface 224 via a channel 228. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 208, storage unit 220, media 214, and signals on channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 200 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of user-controlled digital media distribution, the method being implemented on a computer system that includes one or more physical processors, the method comprising:

providing a graphical user interface configured to receive user-controlled account information via a client computing device to be uploaded onto a digital media distribution platform hosted on a digital media distribution server, the user information including profile information and payment information specifying where both payments and proceeds from purchases and distribution of the digital media shall be withdrawn and deposited;

receiving, over a network, digital media information, the digital media information relating to a digital media owned by a user and associated with a user-controlled account;

generating a digital rights management tool within the graphical user interface of the user-controlled account of the user having a property interest in the digital media, configured to receive one or more distribution parameters, to control the terms and conditions associated with the distribution of the digital media, and to be adjustable in real-time, presenting, within the digital rights management tool, a selectable public distribution authorization indicator, the selectable public distribution authorization indicator including the option to allow the public to distribute the digital media according to the current settings of the distribution parameters;

generating one or more user-controlled web-based digital media stores configured to be populated with the digital media associated with the related user-controlled accounts;

presenting the digital media via a user-controlled web-based digital media store on the digital media distribution platform on the client computing device accessed by the second user via a user-controlled account;

generating a promotional tool, the promotional tool including a plug-in coupled to the user-controlled web-based digital media store and configured to allow the digital media store to be embedded into additional platforms, additional platforms including social networks and other websites;

presenting the digital media via the promotional tool on a client computing device;

responsive to meeting the one or more adjustable distribution parameters, effectuating the distribution of the digital media to a second user via the second user-controlled account;

responsive to the selectable public distribution authorization indicator being set to allow distribution by the public, enabling a third user to present the digital media in the third user's web-based digital media store accessed by the third user via the third user-controlled account;

responsive to a fourth user meeting the one or more adjustable distribution parameters, effectuating the distribution of the digital media to the fourth user via a user-controlled account;

providing social networking functionality to allow for interaction between the users;

obtaining statistical information related to distribution activities associated with the digital media;

analyzing user preferences, patterns, and feedback obtained by the statistical information; and presenting the statistical information instantaneously to the users, both collectively and individually.

2. The method of claim 1, wherein the operations further include allocating proceeds from the distribution of the digital media to the payment accounts of the first and third users.

3. The method of claim 1, wherein the one or more adjustable distribution parameters include; rules that govern the distribution of the digital media and a distribution fee to be paid to the third user upon the distribution of the digital media.

4. The method of claim 1, wherein the input from the user having the property interest in the digital media comes from answers provided to a questionnaire.

5. The method of claim 1, wherein the operations further include adding the digital media to a digital media library.

6. The method of claim 1, wherein the operations further include collecting a distribution payment from the fourth user according to the distribution parameters.

7. The method of claim 1, wherein the operations further include creating a digital profile for each user.

8. The method of claim 1, wherein the statistical information is utilized to provide users with relevant information regarding the digital media.

9. The method of claim 1, wherein the operations further include assisting users in locating the digital media content.

10. A system for user-controlled digital media distribution, the system comprising:
one or more processors configured by machine-readable instructions to:
provide a graphical user interface configured to receive user-controlled account information via a client computing device to be uploaded onto a digital media distribution platform hosted on a digital media distribution server, the user information including profile information and payment information specifying where both payments and proceeds from purchases and distribution of the digital media shall be withdrawn and deposited;

receive, over a network, digital media information, the digital media information relating to digital media owned by a user and associated with a user-controlled account;

generate a digital rights management tool within the graphical user interface of the user-controlled account of the user having a property interest in the digital media, configured to receive one or more distribution parameters, to control the terms and conditions associated with the distribution of the digital media, and to be adjustable in real-time, present, within the digital rights management tool, a selectable public distribution authorization indicator, the selectable public distribution authorization indicator including the option to allow the public to distribute the digital media according to the current settings of the distribution parameters;

generate one or more user-controlled web-based digital media stores configured to be populated with the digital media associated with the related user-controlled accounts;

present the digital media via a user-controlled web-based digital media store on the digital media distribution platform on the client computing device accessed by the second user via a user-controlled account;

generate a promotional tool, the promotional tool including a plug-in coupled to the user-controlled web-based digital media store and configured to allow the digital media store to be embedded into additional platforms, additional platforms including social networks and other websites;

present the digital media via the promotional tool on a client computing device;

responsive to meeting the one or more adjustable distribution parameters, effectuating the distribution of the digital media to the second user via the second user-controlled account;

responsive to the selectable public distribution authorization indicator being set to allow distribution by the public, enabling a third user second user to present the digital media in the third user's web-based digital media store accessed by the third user via the third user-controlled account;

responsive to a fourth user meeting the one or more adjustable distribution parameters, effectuating the distribution of the digital media to the fourth user via a user-controlled account;

provide social networking functionality to allow for interaction between the users;

obtain statistical information related to sale and distribution activities associated with the digital media;

analyze user preferences, patterns, and feedback obtained by the statistical information; and present the statistical information instantaneously to the users, both collectively and individually.

11. The system of claim 10, wherein the operations further include transferring proceeds from selling the digital media to the payment account.

12. The system of claim 10, wherein the one or more adjustable distribution parameters include; rules that govern the distribution of the digital media and a distribution fee to be paid to the third user upon the distribution of the digital media.

13. The system of claim 10, wherein the input from the user having the property interest in the digital media comes from answers provided to a questionnaire.

14. The system of claim 10, wherein the operations further include adding the digital media to a digital media library.

15. The system of claim 10, wherein the operations further include collecting a distribution payment from the fourth user according to the distribution parameters.

16. The system of claim 10, wherein the operations further include creating a digital profile for each user.

17. The system of claim 10, wherein the statistical information is utilized to provide users with relevant information regarding the digital media.

18. The system of claim 10, wherein the operations further include assisting users in locating the digital media.

19. A computer-implemented method of user-controlled digital media distribution, the method being implemented on a computer system that includes one or more physical processors, the method comprising:

provantage a graphical user interface configured to receive user-controlled account information via a client computing device to be uploaded onto a digital media distribution platform hosted on a digital media distribution server, the user information including profile information and payment information specifying where both payments and proceeds from purchases and distribution of the digital media shall be withdrawn and deposited;

receiving, over a network, digital media information, the digital media information relating to a digital media owned by a user and associated with a user-controlled account;

generating a digital rights management tool within the graphical user interface of the user-controlled account of the user having a property interest in the digital media, configured to receive one or more distribution parameters, to control the terms and conditions associated with the distribution of the digital media, and to be adjustable in real-time, presenting, within the digital rights management tool, a selectable public distribution authorization indicator, the selectable public distribution authorization indicator including the option to allow the public to distribute the digital media according to the current settings of the distribution parameters;

generating one or more user-controlled web-based digital media stores configured to be populated with the digital media associated with the related user-controlled accounts;

presenting the digital media via a user-controlled web-based digital media store on the digital media distribution platform on the client computing device accessed by the second user via a user-controlled account;

generating a promotional tool, the promotional tool including a plug-in coupled to the user-controlled web-based digital media store and configured to allow the digital media store to be embedded into additional platforms, additional platforms including social networks and other websites;

responsive to the second user meeting the one or more adjustable distribution parameters, effectuating the distribution of the digital media to the second user;

generating a plug-in coupled to the web-based digital media store and configured for presenting the digital media within the second user's web-based digital media store;

presenting the digital media via the promotional tool on a client computing device;

responsive to meeting the one or more adjustable distribution parameters, effectuating the distribution of the digital media to a second user via the second user-controlled account;

responsive to the selectable public distribution authorization indicator being set to allow distribution by the public, enabling a third user to present the digital media in the third user's web-based digital media store accessed by the third user via the third user-controlled account;

responsive to a fourth user meeting the one or more adjustable distribution parameters, effectuating the distribution of the digital media to the fourth user via a user-controlled account;

providing social networking functionality to allow for interaction between the users;

obtaining statistical information related to distribution activities associated with the digital media;

analyzing user preferences, patterns, and feedback obtained by the statistical information; and reporting the statistical information instantaneously to the users, both collectively and individually.

\* \* \* \* \*